United States Patent [19]

Balzer

[11] Patent Number: 4,917,808

[45] Date of Patent: Apr. 17, 1990

[54] COMPOSITION FOR RECOVERY OF OIL BY SURFACTANT FLOODING WITH A MIXTURE OF CARBOXYMETHYLATED OXETHYLATE AND A SORBITAN ESTER

[75] Inventor: Dieter Balzer, Haltern, Fed. Rep. of Germany

[73] Assignee: Huels Aktiengesellschaft, Marl, Fed. Rep. of Germany

[21] Appl. No.: 310,135

[22] Filed: Feb. 14, 1989

Related U.S. Application Data

[62] Division of Ser. No. 137,205, Dec. 23, 1987, Pat. No. 4,825,951.

[30] Foreign Application Priority Data

Dec. 24, 1986 [DE] Fed. Rep. of Germany ....... 3644386

[51] Int. Cl.$^4$ .............................................. E21B 43/22
[52] U.S. Cl. ................................ 252/8.554; 166/274; 252/8.551; 252/342
[58] Field of Search ........................... 252/8.554, 8.551

[56] References Cited

U.S. PATENT DOCUMENTS 4,402,857  9/1983  Royle ............................... 252/342 X
4,427,564  1/1984  Brownawell et al. ......... 252/8.55 X
4,457,373  7/1984  Balzer et al. .................... 166/274 X
4,528,106  7/1985  Grolitzer ........................ 252/8.55 X
4,582,138  4/1986  Balzer ............................. 252/8.554
4,705,110  11/1987  Balzer ............................. 252/8.554
4,722,396  2/1988  Balzer ............................. 252/8.554
4,825,951  5/1989  Balzer ............................. 252/8.554

Primary Examiner—John F. Terapane
Assistant Examiner—Chhaya Sayala
Attorney, Agent, or Firm—Millen, White & Zelano

[57] ABSTRACT

Oil is recovered from a subsurface reservoir by surfactants. Surfactant flooding is accomplished especially in reservoirs with marked temperature fluctuations or a temperature gradient which are normally problematic since a soluble surfactant effective for oil mobilization does not retain these properties over wide temperature ranges of, e.g., 10° to 100° C. The new process provides a good surfactant effectiveness even at such extreme temporary and/or local temperature fluctuations. A mixture of a carboxymethylated oxethylate and a polyglucosyl sorbitol fatty acid ester is used. The polyglucosyl sorbitols used as fatty acid esters are those with 2 to 20 glucose units. Recovery of oil by such surfactant flooding is useful above all in reservoirs with temporary or local temperature changes.

13 Claims, No Drawings

COMPOSITION FOR RECOVERY OF OIL BY SURFACTANT FLOODING WITH A MIXTURE OF CARBOXYMETHYLATED OXETHYLATE AND A SORBITAN ESTER

This is a division of application Ser. No. 137,205 filed Dec. 23, 1987, now U.S. Pat. No. 4,825,951.

BACKGROUND OF THE INVENTION

In the recovery of oil from a reservoir rock, generally only a fraction of the originally present oil is successfully extracted by primary recovery processes. In this case the oil reaches the surface as a result of the natural reservoir pressure. In secondary oil recovery, water is usually injected into one or more injection wells of the formation and the oil is driven to one or more production wells and then brought to the surface. This so-called water flooding as a secondary measure is relatively inexpensive and consequently is often used but in many cases leads to only a slight additional removal of oil from the reservoir.

An effective displacement of the oil, which is more expensive but in view of the future oil shortage is economically necessary, can be accomplished by tertiary measures. This includes processes in which either the viscosity of the oil is lowered and/or the viscosity of the reflooding water is increased and/or the interfacial tension between water and oil is lowered.

Most of these processes can be classified either as solution or mixture flooding, thermal oil recovery processes, surfactant or polymer flooding and as combinations of several such processes.

Thermal recovery processes comprise the injection of steam or hot water or they occur as subsurface combustion. Solution or mixture processes consist in injection of a solvent for the oil into the reservoir, and this can be a gas and/or a liquid.

In surfactant processes distinctions are made, depending on the surfactant concentration, and optionally the surfactant type and additives: these are surfactant-supported water flooding (a process which can serve, e.g., for increasing the injectivity of injection wells or represent a "low-tension process"), micellar flooding and emulsion flooding. The action of the surfactant flooding is based in the first place on a marked lowering of the interfacial tension between oil and flood water. In addition, the wettability of the rock surface and mobility ratio are very important. Favorable mobility ratios between oil and water are achieved by polymers.

SUMMARY OF THE INVENTION

It is an object of this invention to provide an improved tertiary process.

Upon further study of the specification and appended claims, further objects and advantages of this invention will become apparent to those skilled in the art.

This invention relates to a process for recovery of oil by surfactant flooding or micellar-polymer flooding in medium to high saline reservoirs (e.g., salinities of 1-25% TDS).

The invention particularly relates to a process applicable to reservoirs which are governed by marked temperature fluctuations or a temperature gradient.

Since the temperature of the reservoir rock is basically determined by heat flow from the interior of the earth to the surface area, non-constant temperatures are based either on sharp reservoir slopes or on an intervention in the natural events. Such an intervention is, e.g., the injection of water during water flooding. Long-lasting water flooding, especially of high-temperature reservoirs, often leads to the formation of a marked temperature gradient. This is particularly pronounced in the case of high-temperature offshore reservoirs, which are flooded with cold seawater, which leads to a marked cooling around the injection areas. Thus, e.g., in reservoirs in the North Sea area, temperature spreads between about 10° C. close to the injection sondes and about 100° C. in more distant areas are known.

But a surfactant flooding process is, of course, supposed to be optimally effective in the entire temperature range. This obviously assumes that the surfactant is stable for a long period under reservoir conditions.

Another problem of surfactant flooding is that most of the surfactants suitable for this purpose, as, e.g., alkyl, alkylaryl or petroleum sulfonate, have a very low tolerance limit in regard to the salinity of the reservoir water. Salt concentrations of 1000 ppm are already considered as a problem, and the sensitivity of these surfactants to alkaline-earth ions is particularly pronounced. 500 ppm is mentioned as an upper critical limit concentration of salinity (U.S. Pat. No. 4,110,228). When said surfactants are used, precipitation products, in the presence of higher salt concentrations, form as insoluble salts. As a result, on the one hand, substance for the desired surfactant action at the oil-water interface is lost, and, on the other hand, the precipitation products can lead to clogging of the formation. Now many reservoir waters have substantially higher salinities; a very significant part of the North American light oil reservoirs have salinities of 100,000 ppm and higher, and the content of dissolved alkaline-earth ions in most cases is considerable. Also, the seawater, often injected for secondary measures in offshore reservoirs has, with a TDS value of about 36,000 ppm and alkaline-earth ions of about 2,000 ppm, a salinity far above the compatibility limit for sulfonates.

Typical surfactants, which are tolerant toward extremely high total salinities and corresponding alkaline-earth ion concentrations and which can mobilize oil in a highly effective way, are compounds of the carboxymethylated oxethylate type, ether sulfonates and ether sulfates, as they are described in U.S. Pat. Nos. 4,293,428, 4,299,711, 4,485,873 as well as EP-No. B1-0 064 384. But while ether sulfates (cf. DE-OS No. 25 58 548) must be considered as not temperature-stable, the carboxymethylated oxethylates and ether sulfates are considered as long-time temperature-stable even under drastic conditions.

Carboxymethylated oxethylates can be tailored for specific reservoirs as surfactants for surfactant flooding or micellar-polymer flooding. As shown in U.S. Pat. Nos. 4,457,373 and 4,485,873, the criterion for this matching of the surfactant to the specific reservoir system is the so-called phase inversion temperature (PIT). If the PIT of the crude oil/formation water/surfactant/optional additives is at reservoir temperature or up to 10° C. above it, an optimal action of the surfactant in regard to oil mobilization and oil bed formation is to be expected. A quite usual, relatively insignificant deviation of the local reservoir temperature from its mean value by +5° C. in this case does not particularly influence the surfactant activity. But marked temperature gradients with temperature spreads between 10 to 100° C. drastically impair the action of the carboxymethylated oxethylates. This can be strikingly shown by measurements of the oil/aqueous surfactant solution interfacial tension as a function of the temperature (cf. D. Balzer, Proceedings 2nd European Symposium Enhanced Oil Recovery, Paris 1982). According to this, the interfacial tension of the system of crude oil/formation water/carboxymethylated oxethylate goes through a deep, narrow minimum at a certain temperature, which is usually close to the PIT. However, at markedly lower or higher temperatures the surfactant has for this reservoir system a very much smaller surface activity and consequently a limited effectiveness in oil mobilization. Thus, a marked additional oil removal in the form of an oil bed could be observed with a carboxymethylated oxethylate at 90° C., used on a reservoir system in which the PIT was about 95° C. On the other hand, if the test temperature is lowered to 20° C., only a little residue oil—and even that only in the form of an oil-in-water emulsion—can be released.

Therefore, it is a particular object of this invention to find conditions for the use of the carboxymethylated oxethylates acting in a strongly oil-mobilizing manner in medium to highly saline reservoir systems and which are long-time temperature-stable even under drastic conditions, which guarantees their effectiveness also in reservoirs with temporary and local fluctuations.

These and other objects of this invention are attained in a surprising way by providing a process for recovery of oil from subsurface reservoir rock, which is penetrated by at least one injection well and one production well, by injection of a solution or dispersion of a carboxymethylated oxethylate of the formula $R\text{-}(OC_3H_6)_m(OC_2H_4)_nOCH_2COOM$, in which R is a linear or branched aliphatic radical with 6 to 20 carbon atoms, a monoalkyl aromatic radical with 3 to 18 carbon atoms in the alkyl group or a di- or oligo-alkyl aromatic radical with 1 to 18 carbon atoms per alkyl group, and the total number of carbon atoms in the alkyl chains is 5 to 40, m is 0 to 20, n is 3 to 100, M is an alkali or alkaline-earth metal ion or ammonium and the degree of carboxymethylation is between 10 and 100%, in an injection well, characterized in that the carboxymethylated oxalkylate is used in admixture with a polyglucosyl sorbitol fatty acid ester (PGS ester).

The polyglucosyl sorbitol fatty acid ester is suitably produced from a polyglucosyl sorbitol with 2 to 20 glucose units and a saturated or unsaturated, branched or unbranched fatty acid with 6 to 20, preferably 8 to 18 C atoms, in a ratio of 2:1 to 1:10 molecules of fatty acid/glucose unit.

Polyglucosyl sorbitols are decomposition products of polymer carbohydrates, e.g., starch, usually produced by enzymatic hydrolysis and subsequent hydrogenation. As a function of the conditions of the hydrolysis step, products are attained, which differ in the number of glucose units bonded to one another, and any desired hydrolysis degree can be set. Typical processes for such hydrolysis reactions are well known; see, for example, K. Kainuma in "Starch: Chemistry and Technology", Ed. R. L. Whistler et al., Orlando 1984, page 125.

Of course, a mean hydrolysis degree is always involved, since a distribution of glucose units is present. Polyglucosyl sorbitol "I", "II", and "III" can be suitably differentiated by a rough division, in which in the respective average molecular weight range about 30, 12 or 2 to 3 glucose units per molecule are included. Polyglucosyl sorbitols with not too high a number of glucose units can be particularly easily esterified with fatty acids. In this connection, ratios of 2 to 20 glucose units are favorable, and these fatty acid esters are used in admixture with carboxymethylated oxethylates in the process of the present invention. Saturated or unsaturated, branched or unbranched carboxylic acids with 6 to 20 C atoms, preferably 8 to 18 C atoms, are fatty acids suitable for the production of PGS esters. The ratio of fatty acid to polyglucosyl sorbitol is typically in the range of 2:1 to 1:10 molecules of fatty acid/glucose unit.

The surfactant solution or dispersion to be injected suitably has a concentration of 0.1 to 20% of surfactant. The slug size of the surfactant-containing liquids should be 0.01 to 2 pore volumes (PV). The weight of the carboxymethylated oxethylate is suitably in a weight ratio of 4:1 to 1:4 to that of the PGS ester.

After injection of the surfactant slug, preferably formation or flood water is injected into the reservoir, and the formation or flood water suitably contains a conventional water-soluble viscosity-increasing polymer.

Preferably a cosolvent in a weight ratio of 1:5 to 5:1 is added to the surfactant mixture. Monohydric or polyhydric alcohols or alkyl ethers of polyhydric alcohols can be used as cosolvents.

The carboxymethylated oxethylates to be used according to the invention can be produced, e.g., according to DE-PS No. 24 18 444 by reaction of oxethylates of the formula $R\text{-}(OC_2H_4)_nOH$ or $R\text{-}(OC_3H_6)_m(OC_2H_4)_nOH$ with a salt of chloroacetic acid in the presence of alkali metal hydroxide or other bases. But other production processes are also suitable. In this case, R is a saturated or unsaturated, straight-chain or branched alkyl radical with 6 to 20, preferably 8 to 16 C atoms or a monoalkylaryl radical with 3 to 18, preferably 4 to 16 C atoms in the alkyl chain or a dialkylaryl or oligoalkylaryl radical with up to 18 C atoms per alkyl group, and the total number of carbon atoms in the alkyl chain is 4 to 40, m can take values of 0 to 20, preferably of 0 to 10, particularly of 1 to 20, n can take values of 3 to 100, preferably of 4 to 50, particularly of 4 to 30. The cation M can be sodium, potassium, lithium, ammonium, calcium or magnesium. As alcohols, whose oxethylates are the basis for the carboxymethylates, there can be used, e.g.: hexyl alcohol, octyl alcohol, nonyl alcohol, decyl alcohol, undecyl alcohol, lauryl, tridecyl, myristyl, palmityl and stearyl alcohol, but also unsaturated alcohols such as, e.g., oleyl alcohol. In this case, the alkyl chain can be normal or branched chained. As alkyl phenols there can be used, e.g.: butylphenol, pentylphenol, hexylphenol, octylphenol, nonylphenol, decylphenol, undecylphenol, dodecylphenol, tridecylphenol as well as the corresponding dialkylphenols, such as, e.g., 2-methyl-4-tridecylphenol, 2-dodecyl-4-ethylphenol, dinonylphenol, etc. The alkyl chain can be normal or branched. Trialkylphenols can also be used, such as tri-n-butylphenol, tri-t-butylphenol, dimethylnonylphenol, or tetraalkylphenols such as tetrabutylphenol. The oxethylation can be performed in the presence of catalytic amounts of alkali hydroxide with 0 to 20, preferably 0 to 10, particularly 1 to 20 mol of propylene oxide/mol of hydroxyl compound and then with 3 to 100, preferably 4 to 50, especially 4 to 30 mol of ethylene oxide/mol of hydroxyl compound.

The oxethylates thus resulting are homologous mixtures. The following carboxymethylation can be complete in the corresponding method, so that carboxymethylated oxethylates are purely anionic surfactants. Alternatively, in the case of incomplete carboxymethylation the products still contain more or less large amounts of unreacted oxethylate. The formula R-

$(OC_3H_6)_m(OC_2H_4)_nOCH_2COOM$ therefore often means a mixture with different amounts of unreacted oxethylate $[R-(OC_3H_6)_m(OC_2H_4)_nOH]$. A degree of carboxymethylation can be defined accordingly. It has been shown that mixtures with a degree of carboxymethylation between 10 and 100%, preferably between 50 and 100%, and very particularly between 70 and 100%, are very effective.

The polyglucosyl sorbitol fatty acid esters, used in admixture with the carboxymethylated oxethylates according to the invention, can be produced from polyglucosyl sorbitols with 2 to 20 glucose units, preferably 2 to 15 glucose units, with fatty acids in the presence of basic catalysts, as NaOH, under similar conditions,, as, e.g., they apply for sorbitan esters from anhydrous sorbitol (cf. U.S. Pat. No. 4,297,290). The fatty acids used in this case are saturated or unsaturated, branched or unbranched fatty acids with 6 to 20, preferably 8 to 18 C atoms, such as, e.g., hexanic acid, octanic acid, decanic acid, lauric acid, myristic acid, palmitic acid, stearic acid, arachidic acid, as well as different isomers, acids with double bonds, such as myristoleic acid, oleic acid, erucic acid, linoleic acid, etc. Corresponding fatty acid mixtures are, of course, also suitable as fatty acids. Especially preferred are fatty acid mixtures, which are formed in the decomposition of natural fats. The ratio of fatty acids to polyglucosyl sorbitol can be 2:1 to 1:10, preferably 2:1 to 1:6 molecules of fatty acid/glucose unit.

It has been shown in many tests that the addition of cosurfactants is advantageous. Added in sufficient amounts, the partly markedly cloudy dispersion of the effective surfactant mixture is converted into a solution that is clear as water. Simultaneously, the degree of oil removal caused by surfactants increases in linear displacement tests on cores. Suitable cosurfactants are monohydric alcohols with 3 to 8 C atoms such as, e.g., propanol isomers, butanol isomers, pentanol isomers, etc., or polyhydric alcohols with 3 to 10 C atoms, such as propanediol, butanediol, pentanediol, etc., or alkyl ethers of polyhydric alcohols such as ethylene glycol monoethyl ether, ethylene glycol monoisopropyl ether, ethylene glycol monobutyl ether, diethylene glycol monobutyl ether, etc.

The surfactant or surfactant-cosurfactant mixtures according to the invention must be matched to the condition of the respective reservoir system. In this case, the components of the reservoir water are critical, and if this water is not reinjected, the composition of the flood water, the character of the reservoir oil, the temperature or temperature range of the reservoir, optionally the composition of the gas phase and the reservoir pressure are also critical. Preliminary tests on matching the surfactant system to the reservoir conditions are phase investigations known in the literature, for instance, in the sense of a phase volume diagram (cf. H. Kraft, G. Pusch, SPE/DOE Paper 10714), in which the volumes of the upper, middle and lower phases are determined as a function of the temperature from a mixture of reservoir oil, reservoir water or flood water and surfactant or surfactant/cosurfactant.

Such a surfactant or surfactant/cosurfactant combination is desirable which leads to a phase behavior, largely independent of temperature, with pronounced formation of a middle-phase microemulsion. However, this by itself is not enough. Thus investigations on the decane/seawater system in the presence of alkyl benzene sulfonate/nonylphenoloxethylatene/i-butanol did show the desired phase behavior, largely independent of temperature, but not an adequate oil removal parallel thereto, as investigated in flood tests. Further necessary preliminary tests for matching the surfactant system to the reservoir, which directly show its activity, therefore consist in linear displacement tests on model formations of sandstone or sand, the so-called flood tests, as described in the examples. As distinguished from the phase investigations, in which an equivalent state barely achieved during the surfactant flooding is observed, the displacement tests take into account the unbalanced processes really taking place in the reservoir.

Flood tests, as much as possible on original core material and, if necessary, under reservoir conditions, serve for a laboratory optimizing of the surfactant or surfactant/cosurfactant system with respect to the liquid form of the active substance (solution, dispersion or emulsion), its concentration and its volume, and moreover with respect to the type, concentration and volume of the polymer solution to be used as mobility buffer.

On the basis of these preliminary tests, a surfactant solution or dispersion is introduced into the reservoir by injection pumps. This takes place in the form of slugs, i.e., of limited volumes of 0.01 to 2 PV (=pore volume of the reservoir), preferably 0.02 to 1.2 PV. The size of the surfactant slug is determined by the surfactant concentration and the economic efficiency. Usually, the surfactant concentration is between 0.1 and 20%, preferably between 0.2 and 10%. Only the carboxymethylated oxethylate and polyglucosyl sorbitol fatty acid ester components are included in this surfactant concentration value. The ratios of the weights of the two are 1:4 to 4:1, preferably 1:3 to 3:1. If a cosurfactant is used, the ratio of its weight to that of the surfactant mixture should be 1:5 to 5:1, preferably 1:3 to 3:1.

This invention is effective in reservoirs with large temperature variations or fluctuations, e.g., on the order of 10°–100° C. or larger. It is also especially useful where salinities are high, e.g., 3–25%.

Before injection of the surfactant liquid, flooding with water is suitably performed, and preferably the produced formation water is used as flood water. In special cases, it can be useful to perform flooding with a water of a composition different from that of the formation water. This can have logistical reasons or it is recommended to condition the reservoir with respect to a specific salinity. The size of the flood water slug is 0.01 to 4 PV, preferably 0.1 to 2 PV.

Both because of mobility control—as mentioned——and also to protect the surfactant liquids from penetrating flood water, polymer solution can be injected into the reservoir after the last surfactant liquid. For this purpose, a conventional polymer or a polymer mixture is dissolved in such a concentration in the flood water that the viscosity is 1.2- to 10-fold higher than that of the oil under reservoir conditions. Biopolymers such as, for example, xanthan gum, or cellulose derivatives and polyacrylamides are suitable as polymers, which in the presence of the preset salinity still have a sufficient viscosity and show no precipitations. Suitably, normal water flooding is added to the injection of the polymer solution as a driver. This is continued as long as oil can be recovered economically.

The following examples are to illustrate the process according to the invention. They are linear displacement tests either on sand beddings or on sandstone cores as laboratory model formations.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

For the production of a sand bedding, a thermostatable steel pipe 70 cm long and 5 cm in diameter was provided with a temperature device and a pressure gauge, lockable on both sides with screw locks with a capillary intake and a pressure-holding valve outlet, and charged with quartz sand with rounded edges. Then the sand bedding was wetted with salt water by means of a diaphragm pump and brought to the desired temperature by a thermostat. The permeability of the bedding was determined by pressure transmitters. Then saturation was produced with a model oil (n-decane or crude oil), and at the same time the retained water content could be determined.

Then 1.5 PV (1 PV about 750 ml) of salt water was injected at a rate of about 1 m/d, and a degree of dilution of 98 to 100% occurred. After this so-called water flooding, first the surfactant mixture and then the polymer solution, both as slugs, were injected. More salt water was injected as driver.

Cylindrical cores of Bentheim sandstone 50 cm long and 8 cm in diameter were embedded in epoxy resin for production of model formations from consolidated rock. The pore volumes were about 600 ml, the flooding rate about 0.5 m/d. Temperature regulation in the cores embedded in the resin took place by means of an open temperature bath. Otherwise there were no differences in the operation of these model formations in comparison with that on sand beddings. In all displacement tests, after injection of 0.3 PV of a surfactant system, 0.6 PV of a 0.2% solution of Polymer Flocon 4800 (xanthan, Pfizer) in the relevant salt water was injected into the formation.

EXAMPLES 1 TO 10

The examples according to the invention are represented in the following table. The following substances were used:

Sec:
D n-decane 96%
N 35 API crude oil
   61% paraffinic, 16% napthenic, 23% aromatic hydrocarbons $eta_{20°C}$ 6 mPa s Salt water:
S synthetic seawater
   1.12% $Na^+$, 0.035% $K^+$, 0.047% $Ca^{++}$, 0.133% $Mg^{++}$, 2.03% $Cl^-$, 0.27% $SO_4^{2-}$
T synthetic formation water
   1.51% $Na^+$, 0.035% $K^+$, 0.047% $Ca^{++}$, 0.133% $Mg^{++}$, 2.64% $Cl^-$, 0.27% $SO_4^{2-}$ Carboxymethylated oxethylates:
$C_1$ carboxymethylated nonylphenoloxethylate sodium salt with 5.9 mol EO/mol, degree of carboxymethylation (CM) 81%
$C_2$ carboxymethylated nonylphenoloxethylate sodium salt with 5.0 mol EO/mol, CM 90%
$C_3$ carboxymethylated nonylphenoloxethylate sodium salt with 6.0 mol EO/mol, CM 81%
$C_4$ carboxymethylated dinonylphenoloxethylate sodium salt with 13 mol EO/mol, CM 86%
$C_5$ carboxymethylated nonylphenoloxethylate sodium salt with 8 mol EO/mol, CM 88% polyglucosyl sorbitol fatty acid esters:
$D_1$ PGS-III* coconut oil Edenor K 8-18 (Henkel) ester, molar ratio of glucose to acid 1:1
$D_2$ PGS-III* oleic acid (1:1)
$D_3$ PGS-III* palmitic acid (1:1)
$D_4$ PGS-III* stearic acid (1:1)
$D_5$ PGS-II** colza oil fatty acid (4:1)

\* PGS III means a polyglucosyl sorbitol with about 2 to 3 glucose units per molecule
\*\* PGS II means a polyglucosyl sorbitol with about 12 glucose units.

Cosurfactants:
$E_1$ isobutanol (99.5%)
$E_2$ n-butanol (99.9%)
$E_3$ ethylene glycol monobutyl ether (99%)
$E_4$ ethylene glycol monoisopropyl ether (99%)

The examples (table) show that by the surfactant-cosurfactant mixtures according to the invention an extensive tertiary oil removal over a very broad temperature range is possible.

TABLE

| No. | Formation permeability (D) | | Oil | Salt water | Temp. (°C.) | Surfactant system (%) | | | $DeltaE_w$* | $DeltaE_T$* | Deltap** (bar/m) |
|---|---|---|---|---|---|---|---|---|---|---|---|
| | | | | | | carboxy-methylated oxethylate | PGS Fatty acid ester | cosur-factant | (% OOIP) | | |
| 1 | core | 2.0 | D | S | 20 | $C_1$, 2% | $D_1$, 2% | $E_4$, 4% | 52 | 25 | 0.8 |
| 2 | sand | 1.0 | D | S | 60 | $C_1$, 2% | $D_1$, 2% | $E_4$, 4% | 82 | 15 | 1.2 |
| 3 | core | 2.2 | D | S | 20 | $C_2$, 2% | $D_1$, 2% | $E_2$, 4% | 52 | 33 | 0.5 |
| 4 | sand | 0.7 | D | S | 60 | $C_2$, 2% | $D_1$, 2% | $E_2$, 4% | 84 | 14 | 1.5 |
| 5 | sand | 0.6 | D | S | 90 | $C_2$, 2% | $D_1$, 2% | $E_2$, 4% | 83 | 10 | 1.5 |
| 6 | core | 1.5 | D | S | 50 | $C_3$, 2% | $D_2$, 2% | $E_3$, 4% | 53 | 30 | 0.6 |
| 7 | core | 2.0 | D | S | 70 | $C_4$, 2% | $D_3$, 2% | $E_1$, 4% | 55 | 24 | 1.1 |
| 8 | core | 1.7 | N | S | 70 | $C_4$, 2% | $D_3$, 2% | $E_1$, 4% | 52 | 15 | 2.0 |
| 9 | core | 2.0 | D | T | 50 | $C_5$, 2% | $D_4$, 2% | $E_2$, 6% | 51 | 12 | 1.1 |
| 10 | core | 1.8 | D | S | 60 | $C_3$, 2% | $D_5$, 2% | $E_2$, 6% | 67 | 28 | 1.5 |

*$DeltaE_w$ or $DeltaE_T$ mean oil removal (% OOIP) by means of water flooding or subsequent surfactant flooding
**Deltap is the maximum pressure gradient The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition comprising effective amounts of
   (a) 10–100% of a carboxymethylated oxethylate of the formula $R\text{-}(OC_3H_6)_m(OC_2H_4)_nOCH_2COOM$ and 90–0% of an oxethylate of the formula $R\text{-}(OC_3H_6)_m(OC_2H_4)_nOH$ wherein R is an aliphatic radical of 6 to 20 carbon atoms, an alkyl-$C_{6\text{-}10}$-aromatic radical of 3 to 18 carbon atoms in the alkyl group or a di- or oligo-alkyl-$C_{6\text{-}10}$-aromatic radical of 1 to 18 carbon atoms per alkyl group, the total number of carbon atoms in the alkyl chains being 5 to 40, m is 0 to 20, n is 3 to 100, M is an alkali or alkaline-earth metal ion or ammonium, and
   (b) a fatty acid ester of a polyglucosyl sorbitol.

2. A composition according to claim 1, wherein the polyglucosyl sorbitol fatty acid ester is produced from a polyglucosyl sorbitol of 2 to 20 glucose units and a saturated or unsaturated, branched or unbranched fatty acid of 6 to 20 carbon atoms, the ratio of the two being 2:1 to 1:10 molecules of fatty acid glucose unit.

3. A composition according to claim 1, wherein the surfactant mixture of (a) and (b) has a total concentration of (a) and (b) of 0.1 to 20%.

4. A composition of claim 3, wherein (a) and (b) are dissolved or dispersed in flooring water or formation water.

5. A composition according to claim 1, wherein the weight of mixture (a) is in a ratio of 4:1 to 1:4 to that of the polyglucosyl sorbitol fatty acid ester (b).

6. A composition according to claim 3, wherein the weight of mixture (a) is in a ratio of 4:1 to 1:4 to that of the polyglucosyl sorbitol fatty acid ester (b).

7. A composition according to claim 1, further comprising a cosurfactant which is added to the surfactant mixture in a weight ratio of 1:5 to 5:1 based on the total amount of (a) and (b).

8. A composition according to claim 7, wherein the cosurfactant is a monohydric or polyhydric alcohol or an alkyl ester of a polyhydric alcohol.

9. A composition of claim 1, wherein said amounts in component (a) are 50 to 100% and 50 to 0%, respectively.

10. A composition of claim 1, wherein said amounts in component (a) are 70 to 100% and 30 to 0%, respectively.

11. A composition of claim 2, wherein said number of glucose units is 2–15.

12. A composition of claim 11, wherein said ratio range is 2:1 to 1:6.

13. A composition of claim 5, wherein said ratio range is 3:1 to 1:3.

* * * * *